US008019686B1

(12) United States Patent
Bauer et al.

(10) Patent No.: US 8,019,686 B1
(45) Date of Patent: Sep. 13, 2011

(54) METHOD AND SYSTEM FOR ALLOWING SIMULTANEOUS USAGE OF PREPAID SERVICES

(75) Inventors: Thomas Michael Bauer, Belle Mead, NJ (US); Charles David Caldwell, Asbury Park, NJ (US); Walter H. Hawkins, Freehold, NJ (US); Robert J. Sayko, Colts Neck, NJ (US); Blake Lane Wattenbarger, Fair Haven, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 73 days.

(21) Appl. No.: 12/589,240

(22) Filed: Oct. 20, 2009

Related U.S. Application Data

(63) Continuation of application No. 10/353,524, filed on Jan. 29, 2003, now Pat. No. 7,627,529.

(51) Int. Cl.
*G06Q 40/00* (2006.01)
(52) U.S. Cl. .......................................... 705/44; 705/41
(58) Field of Classification Search .................. 705/44, 705/41, 39, 40, 43, 35, 36 R, 38; 379/114.2; 235/380, 381
See application file for complete search history.

(56) References Cited

U.S. PATENT DOCUMENTS

| | | | | |
|---|---|---|---|---|
| 5,408,519 A * | 4/1995 | Pierce et al. | ............... | 379/88.17 |
| 5,469,497 A * | 11/1995 | Pierce et al. | ............. | 379/114.17 |
| 5,673,309 A * | 9/1997 | Woynoski et al. | ........ | 379/114.18 |
| 5,719,926 A * | 2/1998 | Hill | ........................... | 379/115.02 |
| 5,825,863 A * | 10/1998 | Walker | ....................... | 379/114.2 |
| 5,991,748 A * | 11/1999 | Taskett | ........................... | 705/41 |
| 6,473,500 B1 * | 10/2002 | Risafi et al. | .............. | 379/144.01 |
| 7,072,455 B2 * | 7/2006 | Diaz | ........................ | 379/144.01 |
| 2004/0047459 A1 * | 3/2004 | Diaz | ........................ | 379/144.01 |

OTHER PUBLICATIONS

Lucas "Two Takes on Interchange" May 2002, Credit Card Management V15 N2.*
Taaffe "M-Payments Move a Step Closer" Oct. 8, 2001, Communications Week International, p. 21.*
Anonymous "Lucent and AT&T Sign New Contracts With ITI" Mar. 4, 2002 PRNewsWire.*
Anonymous 'Caremark Acquires Strategic Heathcare Management; Will Help Physicians Form Practice Groups in Evolving Managed Care Markets Oct. 18, 2002 PRNewsWire.*
Lewyn "Mark Lewyn in Washington" 1994, Business Week, Special 1994 Bonus Issue p. 178.*

* cited by examiner

*Primary Examiner* — Kelly Campen

(57) ABSTRACT

A method and system allows multiple and simultaneous use of a pre-paid calling card. A call management system allows for the completion of multiple calls under one pre-paid calling card account number. Depending on the number of concurrent users, a billing system assigns a portion of the total number of available service units to individualized user accounts. The individualized accounts are debited according to the rate charges for each of the calls and are initially assigned an account balance that allows all concurrent users with the same amount of talk time.

19 Claims, 5 Drawing Sheets

FIG. 2

| RATE TABLE ||||
|---|---|---|---|
| Date: Nov. 10, 2002<br>Time: 15:32<br>Call Sequence: 456 ||||
| Account No. Series 9110xxxxxx ||||
| Acount No. 9110123456 ||||
| Orig. Northern New Jersey ||| Term: New York City |
| Peak Rate<br>12 U/Min | Off-Peak Rate<br>6 U/Min || Promotional Discount<br>25% |
| *Calls charged in min. blocks of the number of units per minute<br>*Min Call duration 1 minute ||||

FIG. 3

CALL DETAIL RECORD

Account No: 9101xxxxxx
27-Nov-02  Time: 15:32

From: 1-Oct-02 to 30-Nov-02

| USER | DATE | TIME | LGTH | RATE | COST | TNUMBER | ONUMBER | LOC. | STARTBAL | ENDBAL |
|---|---|---|---|---|---|---|---|---|---|---|
| PCCU | 10-11-02 | 15:32 | 10:20 | 12U/M | 124 | 212-555-1234 | 908-555-8456 | NYC | 1600 | 976 |
| SCCU | 10-11-02 | 15:32 | 6:00 | 12U/M | 124 | 212-555-1255 | 908-555-1256 | NYC | 1600 | 976 |
| SCCU | 10-11-02 | 15:32 | 5:20 | 12U/M | 124 | 212-555-1266 | 908-555-8422 | NYC | 1600 | 976 |
| SCCU | 10-11-02 | 15:32 | 5:00 | 12U/M | 124 | 212-555-1274 | 908-555-3456 | NYC | 1600 | 976 |
| SCCU | 10-11-02 | 15:32 | 5:50 | 12U/M | 124 | 212-555-1238 | 908-555-8455 | NYC | 1600 | 976 |
| PCCU | 10-11-02 | 18:32 | 8:30 | 12U/M | 124 | 212-555-1994 | 908-555-6856 | NYC | 1600 | 976 |
| SCCU | 10-11-02 | 18:32 | 4:20 | 12U/M | 124 | 212-555-1664 | 908-555-4516 | NYC | 1600 | 976 |
| SCCU | 10-11-02 | 18:32 | 6:00 | 12U/M | 124 | 212-555-1243 | 908-555-8336 | NYC | 1600 | 976 |
| SCCU | 10-11-02 | 18:32 | 8:20 | 12U/M | 124 | 212-555-1226 | 908-555-8444 | NYC | 1600 | 976 |

FIG. 4

| CURRENT BALANCE DATA PCCU SINGLE USER DATA ||
|---|---|
| MEMORY ADDRESS | CURRENT BALANCE |
| 0001 | 1700 |
| 0002 | 1688 |
| 0003 | 1676 |
| 0004 | 1664 |
| 0005 | 1652 |
| 0006 | 1640 |
| 0007 | 1628 |
| 0008 | 1616 |
| 0009 | 1604 |

FIG. 5

| RATE TABLE SUMMARY MULTIPLE USER |
|---|
| Date: Nov. 10, 2002<br>Time: 15:32<br>Call Sequence: 456 |
| Account No: Series   9110xxxxxx<br>Account No.  9110123456 |
| PCCU    Orig. Nor.NJ    Term: NYC    Rate    12U/Min    Prom. Discount 25%<br>SCCU1   Orig. Nor.NJ    Term: LA     Rate    18U/Min    Prom. Discount 25%<br>SCCU2   Orig. Nor.NJ    Term: CHGO   Rate     6U/Min    Prom. Discount 25%<br>SCCU3   Orig. Nor.NJ    Term: MIA    Rate     9U/Min    Prom. Discount 25%<br>SCCU4   Orig. Nor.NJ    Term: AC     Rate     3U/Min    Prom. Discount 25% |
| *Calls charged in min. blocks of the number of units per minute<br>*Min Call duration 1 minute |

FIG. 6

| MULTI-USER ACCOUNT BALANCE | | | | | | |
|---|---|---|---|---|---|---|
| MEMORY LOCATION | PCCU BALANCE | SCCU 1 BALANCE | SCCU 2 BALANCE | SCCU 3 BALANCE | SCCU 4 BALANCE | TOTAL BALANCE |
| 0001 | 400 | 600 | 200 | 300 | 100 | 1600 |
| 0002 | 388 | 582 | 194 | 291 | 97 | 1552 |
| 0003 | 376 | 564 | 188 | 282 | 94 | 1504 |
| 0004 | 364 | 540 | 182 | 273 | 91 | 1456 |
| 0005 | 352 | 528 | 176 | 264 | 88 | 1408 |
| 0006 | 340 | 510 | 170 | 255 | 85 | 1360 |
| 0007 | ... | ... | ... | ... | ... | ... |
| 0008 | ... | ... | ... | ... | ... | ... |
| 0009 | ... | ... | ... | ... | ... | ... |
| 000A | ... | ... | ... | ... | ... | ... |
| 000B | ... | ... | ... | ... | ... | ... |
| 000C | ... | ... | ... | ... | ... | ... |
| 000D | ... | ... | ... | ... | ... | ... |
| 000E | ... | ... | ... | ... | ... | ... |
| 000F | ... | ... | ... | ... | ... | ... |

METHOD AND SYSTEM FOR ALLOWING SIMULTANEOUS USAGE OF PREPAID SERVICES

CROSS REFERENCE TO RELATED APPLICATIONS

This application is a continuation of application Ser. No. 10/353,524, entitled "Method and System for Allowing Simultaneous Usage of Prepaid Services," filed Jan. 29, 2003, which issued as U.S. Pat. No. 7,627,529 on Dec. 1, 2009.

FIELD OF THE INVENTION

The disclosed invention broadly relates to a system and method for allocating and managing the account balance of a prepaid calling card service wherein the current balance is dependent upon the number of simultaneous users and is debited and refreshed in accordance with a pre-defined algorithm.

BACKGROUND OF THE INVENTION

Commercial transactions in the form of electronic payments are becoming the standard and preferred means of purchase, and it is becoming increasingly rare to see a business operate on a cash only basis. Consumers are relying more and more on a variety of payment options to pay for a wide range of consumer goods and services. In particular, consumers are now relying on various forms of credit, debit and prepaid cards.

The use of credit cards has been available for more than fifty years and has long been thought of as the reasonable alternative to cash purchases. Large retail stores such as Sears® were initially responsible for their increased popularity and for their first wave of mass distribution. However, early versions of these credit cards were "use" restricted and were accepted only in issuing stores or in affiliated chain of retail stores. Under the early versions of the credit card programs, a retail store would first establish a credit account and determine a credit limit for each credit card applicant. Under a credit card transaction, the cost of the purchase would be debited against the store established credit limit. In effect, the store would honor a promise to pay the purchase amount at the end of a billing cycle.

Since those early days, consumer demand for credit cards has mushroomed to a level necessitating the creation of international processing networks and services such as VISA® and MASTERCARD®. These universal credit card programs allow consumers to make use of credit cards internationally and most importantly allow them to use credit cards at various retail stores, regardless of the merchant selling the product or service. These universal credit cards are primarily issued by sponsoring banks that extend credit to credit card holders. When a consumer makes use of a credit card from a participating bank, the credit card number, the cost of the purchase, and the expiration date as well as other transaction identifying and validating information are transmitted to the credit card program's processing center. During the purchase process, the validity of the credit card number is first established, and then a determination is made whether to allow the transaction to proceed based on a number of account based queries, such as the current balance on the account, and whether the card has been reported lost or stolen. Once approved, the purchase amount is debited against the credit holder's account and a decrement is made to the available credit balance. In return, the credit card holder promises to pay the entire account balance and if unable to pay the entire amount in full, to pay at least a minimum payment amount every month. In return, the issuing bank is the beneficiary of accrued interest charges assessed for non-payment of the entire balance, and of a percentage of the sale price. Moreover, the bank is also the beneficiary of an annual membership fee assessed each card holder for the privilege of having a credit card.

Most recently, and perhaps due to rising concerns over the U.S. economy and the fears about increasing debt load, debit cards have become increasingly more popular. Like credit cards, they are generally associated with an issuing bank. However, debit cards are generally associated with a card holder's existing checking account or savings account and for the most part operate electronically in much the same way that credit cards do. The major distinction between credit cards and debit cards is however that debit cards, as a general rule do not extend a line of credit. Rather, debit cards operate with an actual and tangible balance of funds provided by the debit card holder. Under a debit card transaction, the purchase amounts are deducted from an existing balance at the time the transaction is confirmed and a small fee is paid to the issuing bank for each use. The result being that instead of creating an amount of debt through the use of credit cards, the debit card account decrements the balance of the checking or savings account by the amount of the purchase. Logistically, the processing of the debit against the available balance is done in much the same fashion as credit card transactions. In fact, credit cards currently available in the marketplace may be used in one of two ways. More specifically, these cards may serve as either a credit card or a debit card. At a point of purchase, for example, card holders are often asked to select whether the purchase will be conducted as either a credit or debit transaction.

Alternatively and as a variation to debit cards, prepaid cards are also gaining significant acceptance by the consumer marketplace. A prepaid card operates by first having a pre-established value assigned to it and by then having the prepaid card activated at the merchant's retail store or other point of purchase. The account balance of these prepaid cards is stored in most cases on the prepaid card itself through the use of resident memory. In other cases, however, a remote server dedicated to keeping track of the prepaid account balance is accessed and notified of the transaction. As currently available, prepaid cards, for the most part, are merchant sponsored and are primarily associated with one merchant. Merchant sponsored prepaid cards are normally, only available for use at a merchant's retail point of purchase and are limited in its purchasing power by a pre-established balance. Prepaid cards are typically assigned preset denominations of $10, $25, $50, $75 and $100 cash value. Merchants such as HomeDepot® and Blockbuster® are just two the merchants that have been very successful at distributing prepaid cards for use at their retail stores. The obvious advantage to the use of these cards is that it obligates a consumer into spending the assigned cash values at the issuing merchant. Moreover, prepaid cards provide a means for offering these prepaid cards as gifts to someone without the need for establishing an actual account with the merchant and without the risk of overspending beyond the established limits.

Prepaid cards have not been limited to the purchase of durable goods, but rather have also been used for the purchase of services. In the telecommunications marketplace, for example, prepaid calling cards have during the last ten years also shown significant acceptance by the consumer. At first, telephone companies issued "calling cards" which were best categorized as credit cards for telephone services. These calling cards are typically assigned a calling card number composed of the card holder's ten digit telephone number followed by a four digit pass-code. When a consumer wants to make a call, the caller either dials an "8YY" number to access the telecommunications network or enters "0" followed by the telephone number and the four digit pass-code number of the calling card, and upon hearing a prompt, the calling party enters the number of the called party.

Prepaid calling cards in a debit card mode of operation have also been applied to telecom services. Typically, telephone prepaid calling cards are issued by telephone companies ("TELCOs") or other retail organizations that buy and resell telephone services to the marketplace. Like other prepaid cards, telephone prepaid calling cards have an assigned and pre-set spending limit in dollars, minutes or other service unit denominations and like other prepaid cards the telephone service available is only associated with one TELCO. As a call progresses in length, these pre-set balances are decremented during the call.

Telephone prepaid calling cards are normally assigned a ten, twelve or longer digit card number and a four digit personal identification number ("Pin") by the prepaid calling card issuer. Prior to using the prepaid calling card for the first time, a caller is required to call a toll-free "800" number to activate the card and in some cases permit the caller to personalize and change the previously assigned Pin.

To make a call, the caller typically calls the calling card issuer's access number and is prompted to enter the calling card number and the associated Pin, followed by the called party's telephone number. During the call set up process, the calling card issuer's processing network or an outsourced account balance services provider monitors the call. Based on the length of the call and location of the originating and terminating telephone numbers, the billing system decrements the pre-set balance by pre-set number of minutes, preset cash value or other service unit denominations. When the calling charges equal the minutes, cash value or service units remaining on the calling card, the call is terminated.

The drawback to such prepaid calling cards is that they are generally rendered useless after the calling card balance has been exhausted. More importantly, though, such calling cards work in a very restricted mode of operation. Such calling cards permit only one call per card at any given time. In fact, a simultaneous attempt to use the calling card by a second caller having rightfully obtained the correct account code and Pin will be denied access. For the most part, the blockage of the second caller is a response to possible theft of the calling card or unauthorized access to the prepaid calling card service. Simultaneous usage of prepaid calling cards and concurrent management of multiple account balances are features that are absent from today's market place and that are necessary for sharing pre-set spending limits.

For the foregoing reasons, there is a need for a method and system for managing simultaneous use of prepaid calling card services in a real-time or nearly real-time environment and for simultaneous management of preset spending limits so as to make available funds to all users of the service while maintaining control of account usage by the calling card services provider.

SUMMARY

The need for simultaneous pre-paid calling card services is addressed by the method and system of the present invention which allows a prepaid calling card holder to permit other selected users to have access to telecommunications services under one prepaid calling card account and under the selected usage preferences of the purchaser or the primary prepaid calling card user. A call management system comprising a call switch, call processing and billing system are used to complete a call, monitor call activity and debit account balances. Calls are connected as callers are authenticated as valid account users. Each user is allocated a portion of the total account balance in the prepaid calling card account based on the charge rate for the call so as to preferably provide approximately, the same amount of talk time for each concurrent user.

BRIEF DESCRIPTION OF THE DRAWINGS

These and other features of the present invention will best be understood by reference to the following brief description of a preferred embodiment of the invention, taken in conjunction with accompanying drawings, in which:

FIG. 2 illustrates an exemplary rate table for use in the debiting of a prepaid calling card account;

FIG. 3 illustrates a call detail record used in storing account balances;

FIG. 4 illustrates the account balance of a PCCU in a single user mode of operation;

FIG. 5, illustrates an exemplary rate table for debiting of a prepaid calling card account under a multiple user mode of operation; and FIG. 6 illustrates the account balance of a PCCU and designated SCCUs in a multiple user mode of operation.

DETAILED DESCRIPTION

Figure 1:
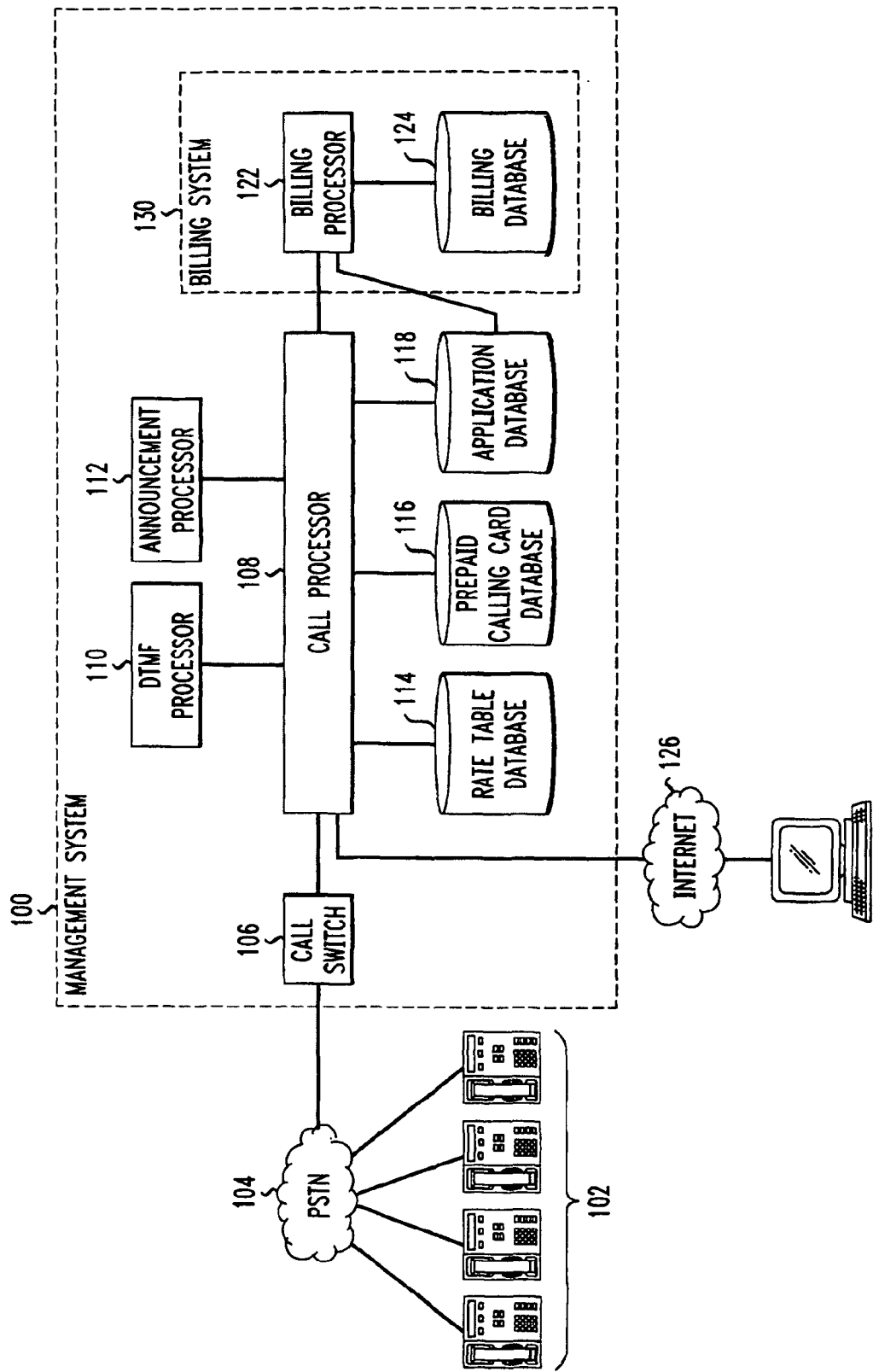
FIG. 1 illustrates a call management system in communications with a public switch telephone network in accordance with an embodiment of the present invention.

Shown in FIG. 1 is schematic diagram of the preferred embodiment of the invention. Although standard residential or business Phones 102 are shown as the means of accessing the Call Management System 100, any audio or visual communications device capable of displaying and relaying alphanumeric characters or dual-tone multi-frequency signaling (DTMF) may be used and may include personal digital assistants (PDAs), wireless phones, transportable phones, portable laptop and desktop computers. For purposes of illustration Phones 102 are used to access the public switching telephone network (PSTN) 104 and are in communication with a Call Switch 106 responsible for directing calls to other components of the Call Management System 100. The Call Switch 106 is in direct communication with the Call Processor 108 at the processing center where the components of Call Management System 100 are located. Call Switch 106 functions as the primary interface with the PSTN 104 and as the switching center for routing and completing calls to the appropriate destinations. Call Processor 108 is the main controller or processor for all the activities at the call processing center. Caller verifications, call switching, caller prompting and billing activities are all controlled and monitored by Call Processor 108. During the processing of an activation request or the placement of a call, Call Processor 108 engages DTMF Processor 112 and Announcement Processor 110 for processing of account service selections and modifications. DTMF Processor 112 is responsible for accepting or receiving tones indicative of a caller's selected preferences via a keypad. Announcement Processor 110 is also engaged in the dialogue with a caller and primarily functions as the means of communicating with the caller under an automated response system. Announcement Processor 110 initiates a query dialogue with the caller by playing standard instructions and questions in a sequence of service related queries and responses by the caller through the use of a touch-tone phone.

Rate Table Database 114, Prepaid Calling Card Database 116, and Applications Database 118 are connected to and in communications with Call Processor 108. Prepaid Calling Card Database 116 stores caller specific information such as calling card information and selected calling card service preferences. During the activation process, Prepaid Calling Card Database 116 is used to authenticate the caller and to store selected modes of operation. Caller preferences such as the number of allowed simultaneous users of one prepaid calling card account, the method of allocating the prepaid balance and the account's refresh options are just a few of the calling card selected options that are stored in Prepaid Calling Card Database 116.

Rate Table Database 114 is responsible for storing rate charges for all associated chargeable features offered under the prepaid calling card service. As calls are established, related rating tables are accessed and used by Call Processor 108 and Billing Processor 122. In particular, the rates designated by an assigned rate table, are used to decrement the prepaid account balances of all concurrent users and to report to the callers the amount of time or other account units that are left on their prepaid calling card.

Application Software Database 118 is responsible for storing application specific software necessary for the provisioning of the prepaid calling services as well as software necessary for the management of the Call Management System 100. Operating system software, processor specific interface software and related driver software to peripheral equipment such as dedicated servers to the Internet 126 and Billing System 130 are just a few examples of the application related software necessary for the operation of the Call Management System 100 and the provisioning of prepaid calling card services.

Billing System 130 manages the allocation of debits against the calling card holder's multiple and concurrent sub-accounts and maintains call detail records relating to the use of prepaid calling card services. As calls are established and progress in duration, the Billing System 130 receives call status data from the Call Processor 108, and uses such call data to assign caller specific balances and apply user specific preferences. Upon the completion of a call or a call session, Billing System 130 stores call detail records (CDRs) in Billing Database 124. Moreover, CDRs are used for reporting debiting and accounting transactions that occurred during a call or call session. In some instances, the CDRs are also used in invoicing certain accounts that have been allowed credit when the charges for a call or call session exceeded the available balance. The Billing System 130 comprises Billing Processor 122 and Billing Database 124 and collectively functions to maintain caller accounts by decrementing and refreshing the available account balances.

A prepaid calling card purchaser activates the prepaid calling card by calling a device specific, toll free "8YY" number to access the prepaid calling card platform. The purchaser of the prepaid calling card will hereafter be referenced as the primary calling card user or "PCCU". To access the Call Management System 100, the PCCU selects the applicable toll free number that is specific to the type of device that will be used to activate the prepaid calling card. The toll-free and device specific telephone numbers are generally preprinted on the back of the prepaid calling cards.

The PCCU dials the applicable toll free number through the touch-tone keypad and waits for a connection to the calling card platform. The call is routed through the PSTN 104 and connected to the intelligent Call Switch 106. Upon detection of a call, Call Switch 106 notifies Call Processor 108 and Announcement Processor 110 of the received call. Call Switch 106 responds by announcing that the PCCU has reached the calling card processing center and by prompting the PCCU, to enter the calling card account number, followed by the pre-assigned PIN number. The audio prompts are under the control of the Call Processor 108 and originate from the Announcement Processor 110.

The PCCU in response to the prompt enters the calling card account number and PIN number on the touch tone keypad. The Call Switch 106 relays the received DTMF signals to the DTMF Processor 112 where the tones are converted into digital ASCII or binary formatted characters and forwarded to the Call Processor 108. The received account number and PIN are used by the Call Processor 108 to access the Prepaid Calling Card Database ("PCCD") 116. Calling Processor 108 launches a query to the PCCD to establish the validity of the account number and the corresponding PIN. In the event that the account and PIN numbers are authenticated by the PCCD 116, the Call Processor 108 instructs Announcement Processor 110 to forward menu and service related announcements back to the PCCU. Otherwise, if the account number or the PIN is invalid, further access to the prepaid calling card platform is denied.

The announcement sent back to the PCCU via the Announcement Processor 110 and Call Switch 106 details in audio form, the available options, features and selections available. More importantly, the announcement sent back queries the PCCU whether the prepaid calling card will be used by a single user or by multiple users. If the PCCU responds via the touch-tone keypad that there will be multiple users, the PCCU is further requested to enter the number of multiple users to be assigned to the prepaid calling card and to assign preliminary or default PINs for each of the additional or secondary prepaid calling card users (SCCU). In addition to the designation of SCCUs, the initial activation session with the Calling Management System 100 will also establish with the PCCU, several operating options and features, including whether the prepaid calling card, may be refreshed through a funding source such as a credit card, debit card or savings account as well as what method of multiple and concurrent balance allocation algorithm will be used during simultaneous use of the prepaid calling card account.

Although several account balance debiting algorithms may be used, including several algorithms capable of maintaining the same talk time to each user, the following preferred algorithm will be used to illustrate an embodiment of the present invention. During the activation session and for purposes of illustration, the PCCU elected to have a prepaid calling card service having an account balance of 1600 service units or approximately $100 cash value. Moreover, the PCCU elected to allow a total of four (4) SCCUs and one (1) PCCU as authorized users to the account and an algorithm that allocates the total number of service units to all users of the account on equal time sharing basis. More specifically, the PCCU elected to permit all users to have the same amount of talk time available to each user, regardless of the usage rate assigned to the call. For example, a call from Northern New Jersey to Los Angeles will be allocated the same amount of time despite the fact that the call is charged at a higher rate than an intrastate call to a neighboring city. The effect however, is that the account balance attributable to the Los Angeles call will always have a much higher balance than the intrastate call.

To make a call, the PCCU once again dials the toll-free number provided by the prepaid calling card issuer to access the Call Management System 100. The Call Switch 106 in conjunction with the Call Processor 108 and Announcement Processor 110 prompts the PCCU to enter the account number and the associated PIN. The PCCU enters the requested data, via the phone's touch-tone key pad. The received data at the Call Switch 106 is then forwarded to the Call Processor 108. The Call Processor 108 in turn queries the PCCD 116 to verify the validity of the account number and PIN. Call Processor 108 makes the determination whether the received data from the PCCU matches the data found in the PCCD 116. In the event that the received account number and PIN are valid, the Call Processor 108 instructs Announcement Processor 110 to access a message file in its resident memory and play "Please enter the telephone number you would like to reach". In response the PCCU enters the DTMF signals representing the called number. Upon receipt of the called number, the Call Processor 108 immediately accesses the Rate Table Database 114 applicable to called number. The rate table applicable to the call is determined by a number of factors including, the account number and PIN, time of day, day of the week, point of origination, point of termination, and means of accessing the Call Management System 100.

The account number is a factor in determining the rate table to be used in a call, especially when the account number is related to a particular marketing effort with a third party or to a particular promotional campaign (e.g. discount program). If for example, a prepaid calling card issuer wishes to engage in a co-marketing effort with a major airline to provide long distance calling card services at a further discount to its frequent flyer members, discount specific prepaid calling cards may be issued. In particular, and as shown in FIG. 2, prepaid calling cards having discount specific account numbers, such as 9110xxxxxx, may be issued to designate the added 25% discount available during the initial or subsequent purchase of talk time minutes. Likewise, the time of day and day of the week would also be factors in assigning a rate table that would be consistent with the actual cost of the call and the applicable access or termination charges and expected profit margins. Since, calls are generally cheaper during nights and weekends, the time of the call will also be a factor in the use of the appropriate rate tables.

In addition, the points of origination and termination are also factors considered in the selection of the appropriate rate table. In particular, whether a call is an international, interstate, intrastate, or local call are factors generally requiring difference rate structures. Overseas administrations, local access charges, interstate charges, surcharges and long distance charges are all just a few of the charge components that affect the rates in the actual rate tables.

In the present embodiment and in response to the voice prompt to enter the called number, the PCCU entered a terminating number assigned to a New York City area code and exchange. The number entered is used by the Call Processor 108 to access the rate table as shown in FIG. 2. The rate table details the factors applicable in charging the call and more importantly, the amount to be debited per debiting interval to the balance of the PCCU's account. As shown in FIG. 2, a call to New York City from Northern New Jersey during peak hours requires the application of a rate of 12 units/minute. The rate data is stored in memory at the PCCD and forwarded to the Billing Processor 122 where a call detail record (CDR) is created for the call in the Billing Database 124.

In the telecommunications industry call detail records have traditionally been created at the Central Office under a decades old process known as Automatic Message Accounting (AMA), by which telephone service providers generate and exchange billing records. Telcordia's Billing AMA format (BAF) is commonly used by ILEC billing systems, while other carriers use an ASCII AMA Format (ACDR) or an XML AMA Format (XCDR) for their billing systems. Although such call detail records would require the use of standardized formats for future exchange with other telephone services providers, the call detail record referenced in FIG. 3, are internal call detail records created for storage in the Billing Database 124 and for monitoring call activity and calculating real-time or nearly real-time account balances. These internal records may however, through a format conversion process and the use of other call data captured by the Billing Processor 122, be formatted at a later time to industry standardized formats acceptable for exchange with other telephone service providers.

After accessing the applicable rate table and engaging the Billing Processor 122, the Call Processor 108 instructs the intelligent Call Switch 106 to complete the call through the standard protocol and process followed in the PSTN 104. When the call is completed to the called party, the account balance monitoring, debiting, and allocating process begins. Since the call placed by the PCCU, is the first and only registered call under the PCCU's account, the accounting process will follow a single user mode whereby the balance of the account is debited by a unit amount determined by the call rate and debited at intervals established by the Call Management System 100. Preferably however, the debiting intervals are the same as the monitoring intervals used by the Call Switch 106 to monitor the status of the call. In particular, a call rate of 12 units/minute will apply a debiting amount of 12 units in one (1) minute debiting intervals. The monitoring interval and the debiting interval should be the same since it is preferable that the monitoring and debiting functions be controlled by a single processing clock or a single processing command. Moreover, the use of a single monitoring and debiting interval will conform to the need for minimum billing increments (e.g. rounding up the total usage amount by the debiting amount).

The accounting process is conducted on a real-time or nearly real-time basis. The Call Processor 108 engages the Call Switch 106 to monitor and report back to the Call Processor 108, the status of the call in one minute intervals. As the call progresses, the Call Processor 108 in turn notifies the Billing System 130 when there is a change in the status of the call. In keeping track of a changing account balance, Billing Processor 122 establishes a dynamic and time dependent record of the current balance of the account. In practice, Billing Processor 122 may use either a long-term storage device or short term memory or a combination of both to keep track of the current account balance. Although, Billing Database 124 may be used to store call data of a completed call, it is preferable if non-volatile memory resident at the Billing Processor 122 is used to process debit instructions and to calculate current balances.

Operationally, and as shown in FIG. 4, the allocated account balance stored in memory has an associated memory address for purposes of entry and recall. Moreover, it preferably has a memory wraparound capability in order to reuse memory upon the exhaustion of the last available memory address. At the start of the billing function, the pre-call balance of the account is entered into memory address (0001). Operationally, Billing Processor 122 does not wait for subsequent instructions from the Call Processor 108 to debit the account balance. Rather, Billing Processor 122, having received billing rate data and clearance to initiate the debiting of the account balance, Billing Processor 122 engages in sequence debiting of the balance by first calculating a fixed per interval (one-minute) rate of decrement and subtracting the debit amount to the then current account balance. The resulting new account balance is then entered to the next memory address as determined by a corresponding memory pointer. As long as the Call Processor 108 does not signal the end of the call, Billing Processor 122 will continue to apply the calculated debit amount and store the current account balance into memory. Moreover, and as will be shown below, the process is self-perpetuating and will continue for as long as the call is in progress or as otherwise instructed by the Call Processor 108 to either terminate or modify the debiting function. When the call is terminated, the Billing Processor 122 will create a call detail record as previously shown in FIG. 3 and store the record in Billing Database 124.

Under a multi-user mode of operation, the Call Processor 108 processes the call in substantially the same manner as shown under a single user mode of operation, except that the Call Processor 108 will associate the various calls under one account number and instruct the Billing System 130 to debit the account balance in the aggregate and individually (as sub-accounts) and in accordance with the PCCU designated algorithm.

In the event, for example, that five (5) calls are received under one prepaid calling card account from the PCCU and four (4) SCCUs, the Call Processor 108 first authenticates the callers and upon successful ID verification, the individuals calls are then connected to their called destinations. However, and unlike the single user mode of operation, the Billing System 130 establishes separate memory space allocations to accommodate the simultaneous debit of the PCCU and four (4) SCCUs. As shown in FIG. 6, Billing Processor 122 establishes under one memory address (0001), five (5) separate memory locations designated as PCCU, SCCU1, SCCU2, SCCU3, and SCCU4. Each of these memory locations may be stored in separate and individualized registers, or in one large memory register capable of tracking and keeping separate, balance values corresponding to the specific user. For example, a general purpose register having 16 bits may be operated as a 16-bit register or it may be parsed into a group of two (2), eight-bit registers, since under a shared memory architecture, the upper and lower halves of the 16-bit register are separately addressable. Regardless of the physical architecture used in memory storage, the memory locations for any shared memory architecture would preferably use the same memory address (e.g. 0001 ... FFFF) to designate a particular period of time. As contemplated by the present embodiment of the invention, the decrement to the account balance of each of the users (PCCU or SCCUs), will be preferably applied in accordance with the frequency interval the Call Switch 106 monitors the status of the calls. For example, if the calls are monitored by the Call Switch 106 in one (1) minute intervals, then the decrements to all the account balances would likewise be applied in one minute intervals. Moreover, it is preferable that the period number assigned to the first user coincide with the memory address of the account balance of the first user. In period one (1) (i.e., first minute), for example, the account balance of the first user (PCCU or SCCU) should be designated as memory address 0001. As subsequent users make use of the same prepaid account number, the additional users (SCCUs) will be assigned the same memory address so as to coincide and be in-step with the memory address of the first user. In particular, if a PCCU completes a call and immediately thereafter, an SCCU establishes a call during the fourth period (4 minutes into the PCCU's call), the SCCU will be assigned as its first memory address, the address of 0004. Thereafter, as the calls progress for both the PCCU and the SCCU, the account balances for each party will be calculated and stored under the same memory address as the PCCU (first user). Although the same memory address will be used, the actual memory address may be that of the same or different registers. Under this methodology, all concurrent users will have the same memory address during the progress of a call, but may not share the same physical registers. Regardless of the actual registers used in keeping track of multiple account balances, the account balances will be synchronized and updated in-step with the frequency interval the Call Switch 106 monitors the status of the calls and the Billing Processor 122 debits the account balances.

As shown in FIG. 5, the simultaneous use of the prepaid calling card account balance will depending on the type of call, allocate a usage rate or debit rate for each of the calls. For example, the PCCU will be charged at a rate of 12 units/minute, while SCCUs 1, 2, 3 & 4 will be charged rates of 18 U/Min, 6 U/Min, 9 U/Min and 3 U/Min respectively. In accordance with the invention, the rates will be used to allocate the available account balances for each of the concurrent users. The higher the usage rate the more units of service will be allocated to the user's account. The allocation of the total account balance to each of the user's balance will be calculated by the Billing Processor 122 by considering each usage rate and selecting the lowest usage as the reference usage rate. In FIG. 5, the reference usage rate is 3 U/Min for a SCCU4 call from Northern New Jersey to Atlantic City. All other calls will be compared to the reference usage rate and will be assigned service units in proportion to the ratio between the reference usage rate and the rate of the call and such that all users will have the same amount of talk time. More specifically, the call to Chicago (6 U/Min) will be assigned twice as many service units as the reference usage rate of 3 U/Min. Likewise, the calls to Miami (9 U/Min), Los Angeles (18 U/Min) and New York City (12 U/Min) will be allocated 3×, 6×, and 4× the number of service units respectively, than that allocated to the intrastate call to Atlantic City (reference rate). Under this method of allocation, the prepaid calling card service will allow simultaneous access to the one account, while allocating the total account balance to all users on equal time or equal usage basis.

In FIG. 6, multiple uses of the prepaid calling card service and the allocated number of service units are shown. As debiting intervals sequence forward, the amount debited to each of the PCCU and SCCUs is calculated and stored in each of the memory addresses. Each user is debited at a rate equal to the usage rate and assigned an account balance having the same amount of talk time. At the start of the debiting cycle shown under memory address 0001 (debiting interval 1), the individual account balances all reflect different account balances. However, it should be realized that each of the users in effect have been allocated 100 minutes of usage time. The differences in each individual account are due to the rate charge or debit rate assigned to the call. As the call progresses in duration, each account will be depleted at different rates. However, each call will be allowed the same amount of talk time, in the event that all five calls remain active for the initially allocated 100 minutes of talk time.

In the event that any of the users (PCCU or SCCU) terminates a call, the Billing Processor 122 will immediately determine the total number of service units remaining under the prepaid calling card account and immediately designate new service unit account balances to each of the remaining users. Conversely, should the Call Processor 108 allow additional usage of the account by another user, the Billing System 130, will once again determine the new total account balance and assign specific account balances based on the debit rate.

By designating specific account balances to each user, a PCCU may during the activation of the prepaid calling card account, designate certain administrative options. In particular, a PCCU may for example designate that when the individual user accounts are within 10 minutes of depletion, the Billing Processor 122 may debit a pre-determined amount from the PCCU's credit card, debit card, or savings accounts and refresh the account by purchasing additional service units. Alternatively, the Call Processor 108 may through the Announcement Processor 110, notify the PCCU and SCCUs that the account balances are nearing depletion and that if a refresh of the prepaid account is desired, to enter the amount of service units to be purchased. By having the Billing Processor 122 accept simultaneous users and keeping track of individual user accounts, a PCCU may designate individualized and simultaneous use of the account balance.

The foregoing description of an embodiment of the present invention should be considered as illustrative and not as limiting. The different types of accounting methods are indicative of the variations to the systems and methods of the present invention. Various other changes and modifications will occur to those skilled in the art for accomplishing the same result and for operating in substantially the same way without departing from the true scope of the invention as defined in the claims appended hereto.

What is claimed is:

1. A method for multiple and simultaneous use of a prepaid calling card account by a plurality of calling parties, comprising:
   authenticating, by a call management system, first and second calling parties for concurrent use of an account of the prepaid calling card service;
   allocating, by the call management system, portions of a prepaid account balance of the prepaid calling card account to a first call placed by the first calling party and to a second call placed by the second calling party;
   connecting, by a call switch of the call management system, the first and second calls; and
   simultaneously debiting, by a billing system of the call management system, the portion of the prepaid account balance allocated to the first call and debiting the portion of the prepaid account balance allocated to the second call.

2. The method of claim 1, wherein allocating portions of a prepaid account balance includes:
   comparing a first debit rate for the first calling party with a second debit rate for the second calling party;
   selecting a lowest debit rate of the first debit rate and the second debit rate as the reference debit rate;
   dividing the first debit rate by the reference debit rate and obtaining a first factor;
   dividing the second debit rate by the reference debit rate and obtaining a second factor; and
   apportioning the first calling party with a first account balance and the second calling party with a second account balance such that the ratio of the second account balance and the first account balance and the ratio of the second factor and the first factor are the same.

3. The method according to claim 1, wherein allocating portions of a prepaid account balance is done on a real-time basis.

4. The method according to claim 1, further comprising storing a first portion of the prepaid account balance to a first memory register and a second and remaining portion of the prepaid account balance to a second memory register.

5. The method according to claim 1, wherein allocating portions of the prepaid account balance includes using a first calling rate applicable to the first call and a second call rate applicable to the second call such that the first calling party and second calling party are allocated the same amount of talk time.

6. The method according to claim 1, further comprising creating a single call detail record upon the termination of the first and second calls and storing the call detail record in a billing system database.

7. The method according to claim 1, further comprising debiting the prepaid account balances of both the first and second calls at the same frequency that a call switch monitors the activity of the first and second calls.

8. The method according to claim 1, further comprising re-allocating the prepaid account balance to a remaining calling party of the prepaid calling card service after one of the first or second calling parties terminates a call.

9. A method for using a prepaid calling card for multiple and concurrent calls by multiple users, the method being performed in a call management system and comprising:
   receiving, by a calling switch in the call management system, from a primary calling card user, an activation call;
   prompting, by an announcement processor of the call management system, the primary calling card user for an account number and pre-assigned PIN;
   receiving and verifying, by the call management system, the account number and the pre-assigned PIN;
   prompting, by the announcement processor of the call management system, the primary calling card user for an indication that the prepaid calling card is to be used by multiple users in addition to the primary user;
   receiving, by the call management system, the indication that the prepaid calling card is to be used by multiple users in addition to the primary user;
   assigning, by the call management system, additional PINs for each of the multiple users;
   using the pre-assigned PIN and at least one of the additional PINs, authorizing, by the call management system, separate multiple and concurrent calls by users of the prepaid card;
   connecting, by a calling switch in the call management system, the separate multiple and concurrent calls; and
   debiting, by a billing system in the call management system, an account balance of the prepaid card for each of the multiple and concurrent calls.

10. The method of claim 9, further comprising allocating a portion of an account balance of the prepaid calling card to each of the separate multiple and concurrent calls.

11. The method according to claim 10, wherein allocating a portion of the account balance is done on a real-time basis.

12. The method according to claim 9, further comprising completing a first call after authorizing a first call from the separate multiple and concurrent calls.

13. The method according to claim 9, further comprising storing a portion of the account balance in memory registers corresponding to each of the multiple and concurrent calls.

14. The method according to claim 9, further comprising allocating a portion of the prepaid account balance to each of the multiple users by using a calling rate applicable to each of the separate multiple and concurrent calls and such that the each of the multiple and concurrent calls are allocated the same amount of talk time.

15. The method according to claim 9, further comprising creating a single call detail record upon the termination of the calls placed by all of the users and storing the call detail record in a billing system database.

16. The method according to claim 9, further comprising debiting the account balance for each of the multiple and concurrent calls at the same frequency that a call switch monitors the activity of each of the multiple and concurrent calls.

17. The method according to claim 9, further comprising re-allocating the prepaid account balance to one or more remaining users of the prepaid calling card service after one or more of the users terminates a call.

18. A non-transitory computer-usable medium having computer readable instructions stored thereon for execution by a processor to perform a method for multiple and simultaneous use of a prepaid calling card account by a plurality of calling parties, comprising:

authenticating first and second calling parties for concurrent use of an account of the prepaid calling card service in a call management system;

allocating portions of a prepaid account balance of the prepaid calling card account to a first call and to a second call;

connecting the first and second calls; and simultaneously debiting the portion of the prepaid account balance allocated to the first call and debiting the portion of the prepaid account balance allocated to the second call.

19. The non-transitory computer-usable medium according to claim 18, wherein allocating portions of a prepaid account balance is done on a real-time basis.

\* \* \* \* \*